United States Patent
Chen (10) Patent No.: US 9,158,886 B1
(45) Date of Patent: Oct. 13, 2015

(54) METHOD OF DESIGNING FIN-BASED TRANSISTOR FOR POWER OPTIMIZATION

(71) Applicant: UNITED MICROELECTRONICS CORP., Hsin-Chu (TW)

(72) Inventor: Chien-Hung Chen, Taipei (TW)

(73) Assignee: UNITED MICROELECTRONICS CORP., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/450,299

(22) Filed: Aug. 4, 2014

(30) Foreign Application Priority Data

Jun. 30, 2014 (TW) .............. 103122521 A (51) Int. Cl.
*H01L 21/66* (2006.01)
*G01R 31/26* (2014.01)
*G06F 17/50* (2006.01)

(52) U.S. Cl.
CPC ........ *G06F 17/5081* (2013.01); *G06F 17/5072* (2013.01); *G06F 2217/78* (2013.01); *G06F 2217/84* (2013.01)

(58) Field of Classification Search
USPC ........................................ 438/17
See application file for complete search history.

(56) References Cited

U.S. PATENT DOCUMENTS

| 8,490,043 B2 | 7/2013 | Gupta et al. |
| 8,533,651 B1 | 9/2013 | Tan et al. |
| 8,631,382 B2 | 1/2014 | Wang et al. |
| 2013/0275935 A1 | 10/2013 | Rashed et al. |
| 2015/0121329 A1* | 4/2015 | Fu et al. ............. 716/133 |

* cited by examiner

*Primary Examiner* — Asok K Sarkar
(74) *Attorney, Agent, or Firm* — Winston Hsu; Scott Margo (57) ABSTRACT

A method of designing a fin-based transistor for power optimization includes following steps. A planar field-effect transistor (planar-FET) design including a plurality of planar semiconductor devices is received. An initial fin field-effect transistor (FinFET) design including a plurality of fin-based semiconductor devices corresponding to the planar semiconductor devices is generated. A timing analysis is performed to the initial FinFET design to recognize at least a critical path and at least a non-critical path in the initial FinFET design. The non-critical path includes at least one of the fin-based semiconductor devices. The fin-based semiconductor device on the non-critical path is adjusted and thus a refined FinFET design is generated. A current required by the refined FinFET design is lower than a current required by the initial FinFET design.

20 Claims, 10 Drawing Sheets

METHOD OF DESIGNING FIN-BASED TRANSISTOR FOR POWER OPTIMIZATION

BACKGROUND OF THE INVENTION

1. Field of the Invention

The present invention relates to a method of designing a fin-based transistor, and more particularly, to a method of designing a fin-based transistor for power optimization.

2. Description of the Prior Art

Conventional planar metal-oxide-semiconductor (MOS) transistor has difficulty when scaling down to 65 nm and below. Therefore the non-planar transistor technology such as Fin Field effect transistor (hereinafter abbreviated as FinFET) technology that allows smaller size and higher performance is developed to replace the planar MOS transistor.

The FinFET device is conventionally formed by: First a silicon layer of a substrate is patterned to form fin structures (not shown) by a proper etching process. A gate insulating layer and a gate conductive layer are formed and patterned to form gate electrodes covering portions of the fin structures. Next, dopants are introduced and annealing treatments are performed to form sources/drains in the fin structures not covered by the gate electrodes. Since the manufacturing processes of the FinFET device are similar to the traditional logic device processes, it provides superior process compatibility. More important, FinFET devices can be obtained by conversion of a planar design to FinFET design.

Furthermore, since the FinFET device increases the overlapping area between the gate electrode and the fin structures, the channel region is more effectively controlled. This therefore reduces drain-induced barrier lowering (DIBL) effect and short channel effect, and the current between the source and the drain is increased. Though FinFET design offers many advantages, there is still a demand for approaches that can improve performance characteristics of integrated circuits. For example, power consumption is one important aspect of the circuit performance. High power consumption in integrated circuits shortens battery life and reduces circuit performance and reliability. Therefore, a method of designing a fin-based transistor with power optimization is always in need.

SUMMARY OF THE INVENTION

According to an aspect of the present invention, a method of designing a fin-based transistor is provided. According to the provided method, an initial FinFET design is received. The initial FinFET design includes a plurality of fin-based semiconductor devices. Additionally, the initial FinFET design can be obtained by receiving a planar-FET design including a plurality of planar semiconductor devices and generating the initial FinFET design including the fin-based semiconductor devices corresponding to the planar semiconductor devices of the planar-FET design. Next, a timing analysis is performed to recognize at least a critical path and at least a non-critical path in the initial FinFET design. The non-critical path includes at least one of the fin-based semiconductor devices. After performing the timing analysis, the fin-based semiconductor device on the non-critical path in the initial FinFET design is adjusted to generate a refined FinFET design. A current required by the refined FinFET design is lower than a current required by the initial FinFET design.

According to the present invention, the fin-based semiconductor device in the initial FinFET design are categorized into the critical path and non-critical path, and the fin-based semiconductor device on the non-critical path in the initial FinFET design is adjusted. For example, an amount of initial fins of the fin-based semiconductor device can be reduced, a width of the initial fins of the fin-based semiconductor device can be increased, or an amount of the initial fins being electrically connected together can be reduced according to the present invention. Consequently, the refined FinFET design including the fin-based semiconductor device having the abovementioned adjusted fins is obtained. More important, since current required by FinFET technology is related to the amount of the fins, the width of the fins, and the amount of the fins being electrically connected together, power optimization can be efficaciously achieved by adjusting the abovementioned factors, and thus current required by the refined FinFET design is lower than a current required by the initial FinFET design. That is, power optimization to the fin-based transistor is easily achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
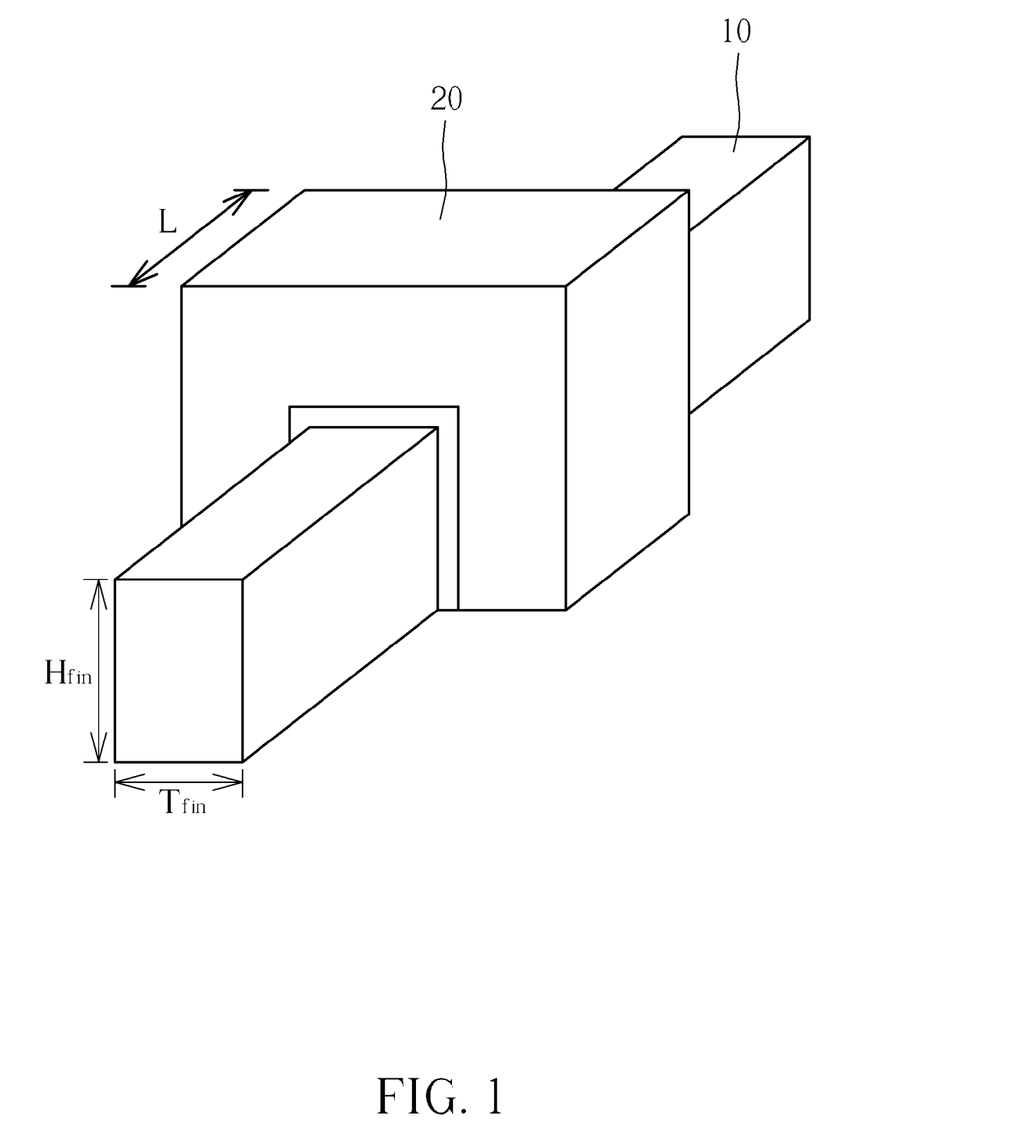
FIG. 1 is a schematic drawing illustrating a FinFET design.

Please refer to FIG. 1, which is a schematic drawing illustrating a FinFET design. As shown in FIG. 1, the FinFET design includes at least a silicon fin 10 formed on a substrate, and a gate electrode 20 is formed to cover a portion of the silicon fin 10. A source/drain (not shown) is formed the silicon fin 10 at two respective sides of the gate electrode 20. It is noteworthy that in the FinFET design, an effective width $W_{eff}$ of the fin is a sum of heights $H_{fin}$ of two sidewalls of the silicon fin 10 and a width $T_{fin}$ of a top surface of the silicon fin 10.

Please still refer to FIG. 1. According to simple MOS larger-signal model, a current formula of the semiconductor transistor can be defined as following Equation 1:

$$I_{ds} = u_0/2(W_{eff}/L_{eff})(V_{gs}-V_t)^2 \qquad \text{Equation 1}$$

In Equation 1, $\mu_0$ is the surface mobility of the channel region, and $W_{eff}$ is the effective channel width, which is the effective width $W_{eff}$ of the fin as mention above in the FinFET design. $L_{eff}$ is the effective channel length, $V_{gs}$ is the electrical potential difference between the gate and the source, and $V_t$ is the threshold voltage of the transistor.

More important, formulas for power consumption of Fin-FET design, such as Equation 2 and Equation 3 can be derived from the above Equation 1:

$$\text{Power} = \text{Total } I_{ds} * \text{Operation Voltage} \qquad \text{Equation 2}$$

$$\text{Total } I_{ds} = u_0/2(W_{eff}/L_{eff})(V_{gs}-V_t)^2 * \text{Fin number} \qquad \text{Equation 3}$$

According to Equation 2, it is observed that the power consumption of the FinFET design is related with a sum of total current $I_{ds}$. And according to Equation 3, it is observed that the sum of total current $I_{ds}$ is related with the effective width $W_{eff}$ of the fins and an amount of the fins.

Figure 10:
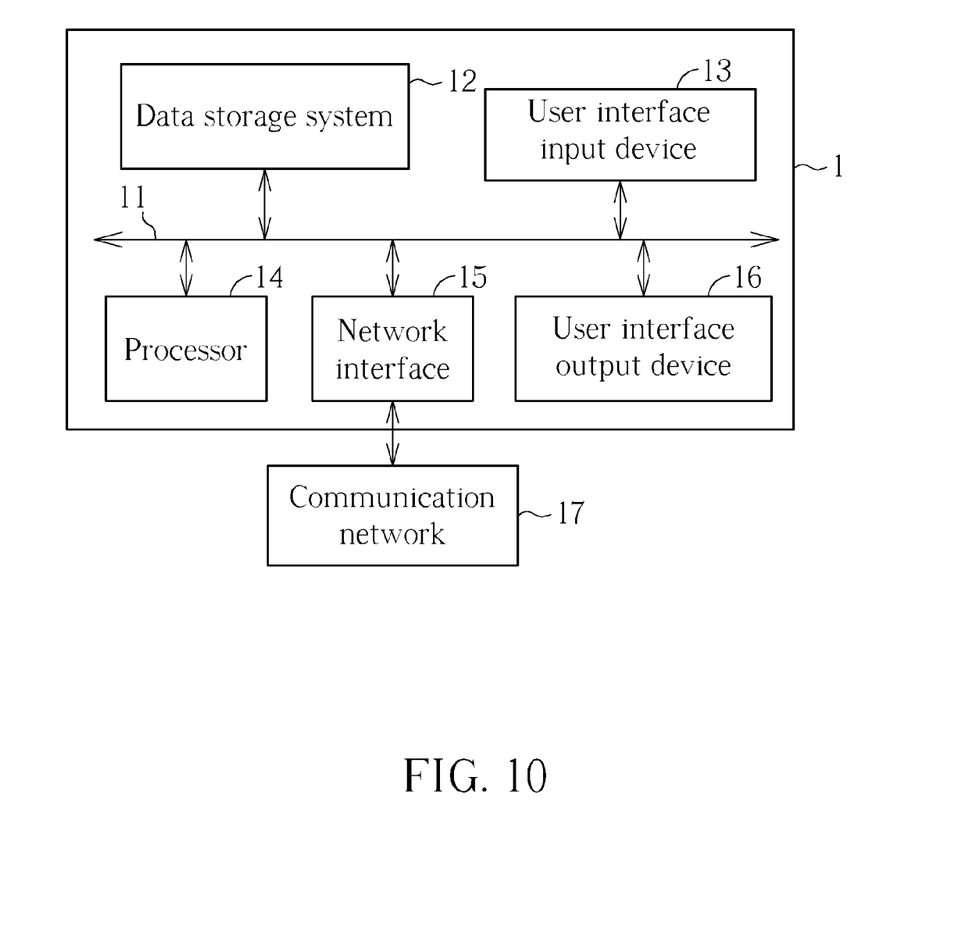
FIG. 10 is a schematic drawing illustrating a computer system suitable for use with embodiments of the present invention.

It is noteworthy that the method of designing a fin-based transistor provided by the present invention can be performed in a computer-aided design (CAD) platform. Please refer to FIG. 10, which is a schematic drawing illustrating a computer system suitable for use with embodiments of the present invention. The computer system 1 includes a system bus 11, a data storage system 12, a user interface input device 13, a processor 14, a network interface 15, and a user interface output device 16. The data storage system 12 provides persistent storage for program and data files. In the present invention, the data storage system 12 provides one or more CAD tool functions. The user interface input device 13 and the user interface output device 16 includes all possible types of device and ways to input/output information into or from the computer system 1. The network interface 15 serves as an interface to outside networks and is coupled to corresponding interface devices in other computer systems via a communication network 17. Additionally, the computer system 1 itself can be of varying types including a personal computer, a portable computer, a workstation, a computer terminal, a network computer or user device. The computer system 1 is exemplarily shown in FIG. 10, and those skilled in the art would easily realize that the computer system 1 can include other components or elements.

Figure 2:
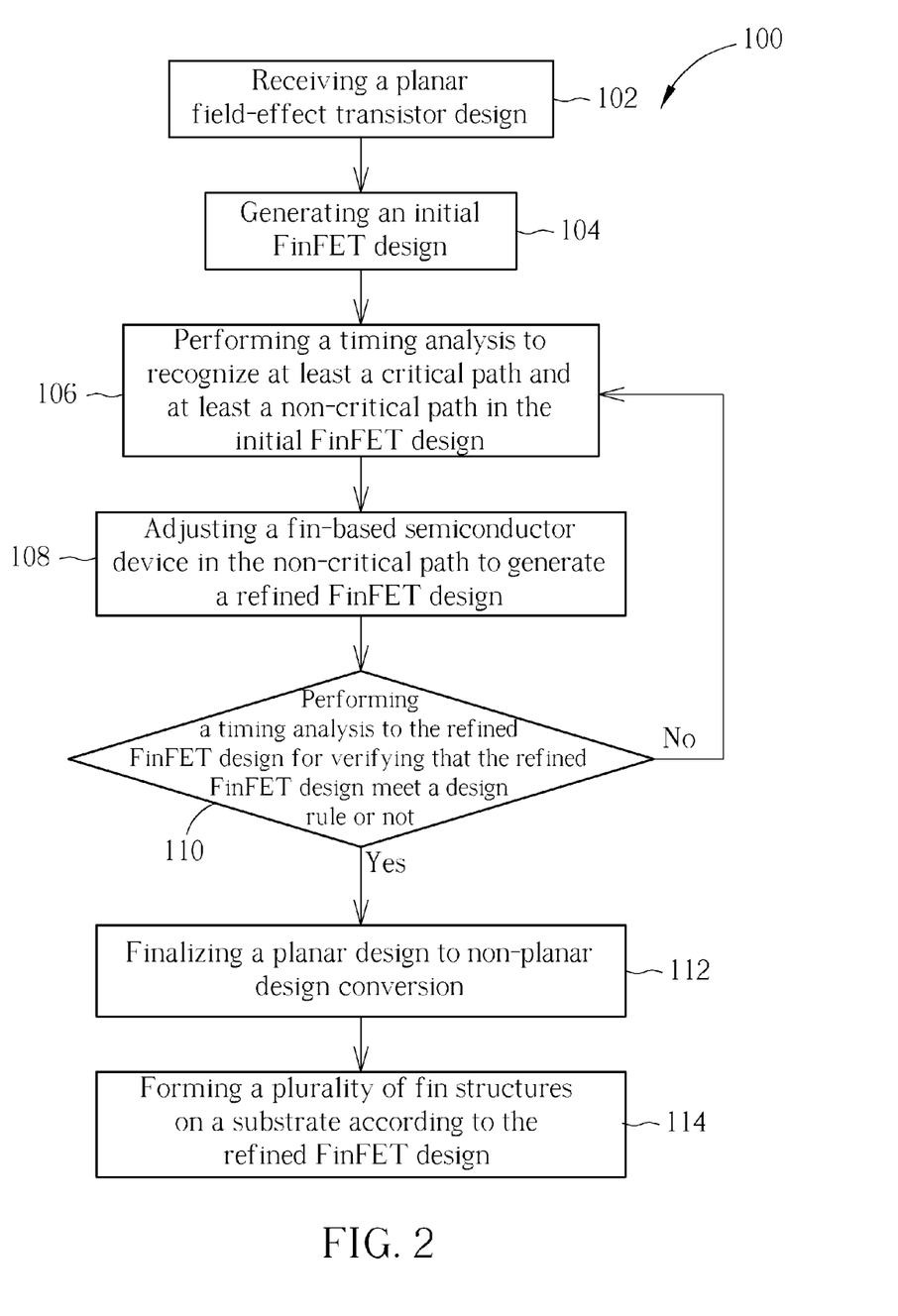
FIG. 2 is a flowchart of a method of designing a fin-based transistor provided by the present invention.

Please refer to FIG. 2, which is a flowchart of a method of designing a fin-based transistor 100 provided by the present invention. According to the present invention, the method of designing the fin-based transistor includes the following steps:

Step 102: Receiving a planar field-effect transistor design

According to the method of designing the fin-based transistor 100 provided by the present invention, a planar field-effect transistor (planar-FET) design is received. The planar-FET design includes a plurality of planar semiconductor device layouts such as diffusion regions (also known as active regions) of the planar-FETs, gate layers of the planar-FETs, or connection layers.

The method of designing the fin-based transistor 100 provided by the present invention also includes Step 104: Generating an initial FinFET design According to the method of designing the fin-based transistor 100 provided by the present invention, the initial FinFET design is converted from the planar-FET design. Consequently, the initial FinFET design includes a plurality of fin-based semiconductor devices and those fin-based semiconductor devices are corresponding to the planar semiconductor devices of the planar-FET design. More important, the fin-based semiconductor devices in the initial FinFET design respectively includes a plurality of initial fins serving for replacing the diffusion regions in the planar-FET.

The method of designing the fin-based transistor 100 provided by the present invention further includes:

Step 106: Performing a timing analysis to recognize at least a critical path and at least a non-critical path in the initial FinFET design Generally speaking, timing analysis calculates circuit timing delays and ensures that those delays are within bounds as specified by used constraints. There are two major types of timing analysis, namely, static timing analysis (hereinafter abbreviated as STA) and dynamic timing analysis (hereinafter abbreviated as DTA). STA basically calculates all of the individual delays associated with different portions of a circuit and then generates a report detailing the minimum and maximum delays associated with each possible path. On the other hands, DTA typically specifies an event that may occur sometime within a certain time period and then determines the timing along different paths of the circuit in response to the event. According to the present invention, STA and DTA are used to recognize and analyze the high and low alternating frequencies of the devices on the critical paths and the non-critical paths in the initial FinFET design. And thus devices available or suitable for current modulation in the whole circuit design are found and modulated. Consequently, power consumption of the refined/modulated FinFET design is lowered without impacting the electrical performance. In what is known as STA, the designer can easily recognize the critical path because the critical path includes more logic gates and thus the path delay is longer. On the contrary, the non-critical path has shorter path delay because it includes less logic gates. Therefore, after STA, the critical paths and the non-critical paths in the initial FinFET design can be easily and accurately recognized: A timing delay of the non-critical path is shorter than a timing delay of the critical path. The non-critical path includes at least one of fin-based semiconductor devices. Preferably, STA is performed and followed by performing DTA, which is optional if required, according to the present invention, but not limited to this.

The method of designing the fin-based transistor 100 provided by the present invention further includes:

Step 108: Adjusting a fin-based semiconductor device on the non-critical path to generate a refined FinFET design Step 110: Performing a timing analysis to the refined FinFET design for verifying that the refined FinFET design meet a design rule or not Step 112: Finalizing a planar design to non-planar design conversion Step 114: Forming a plurality of fin structures on a substrate according to the refined FinFET design According to the method of designing the fin-based transistor 100 provided by the present invention, the fin-based semiconductor device, particular the initial fins of the fin-based semiconductor device on the non-critical path are adjusted after recognizing the non-critical path in the initial FinFET design. Consequently, a plurality of refined fins are obtained and thus a refined FinFET design is generated. Then, Step 110 is performed: A timing analysis is performed to the refined FinFET design for verifying that the refined FinFET design meet a design rule or not. When the refined FinFET design meets the design rule, Step 112 is performed and a planar design to non-planar design conversion is finalized. Next, Step 114 is performed to form a plurality of fin-based semiconductor devices on a semiconductor substrate, and those fin-based semiconductor devices include the above-mentioned refined fins. When the refined FinFET design does not the design rule, the refined fins of the fin-based semiconductor device on the non-critical path in the refined FinFET design are tuned and followed by performing Step 110 again. Such steps can be repeatedly performed until the refined FinFET design meets the design rule and thus Steps 112-114 are then performed.

Figure 3:
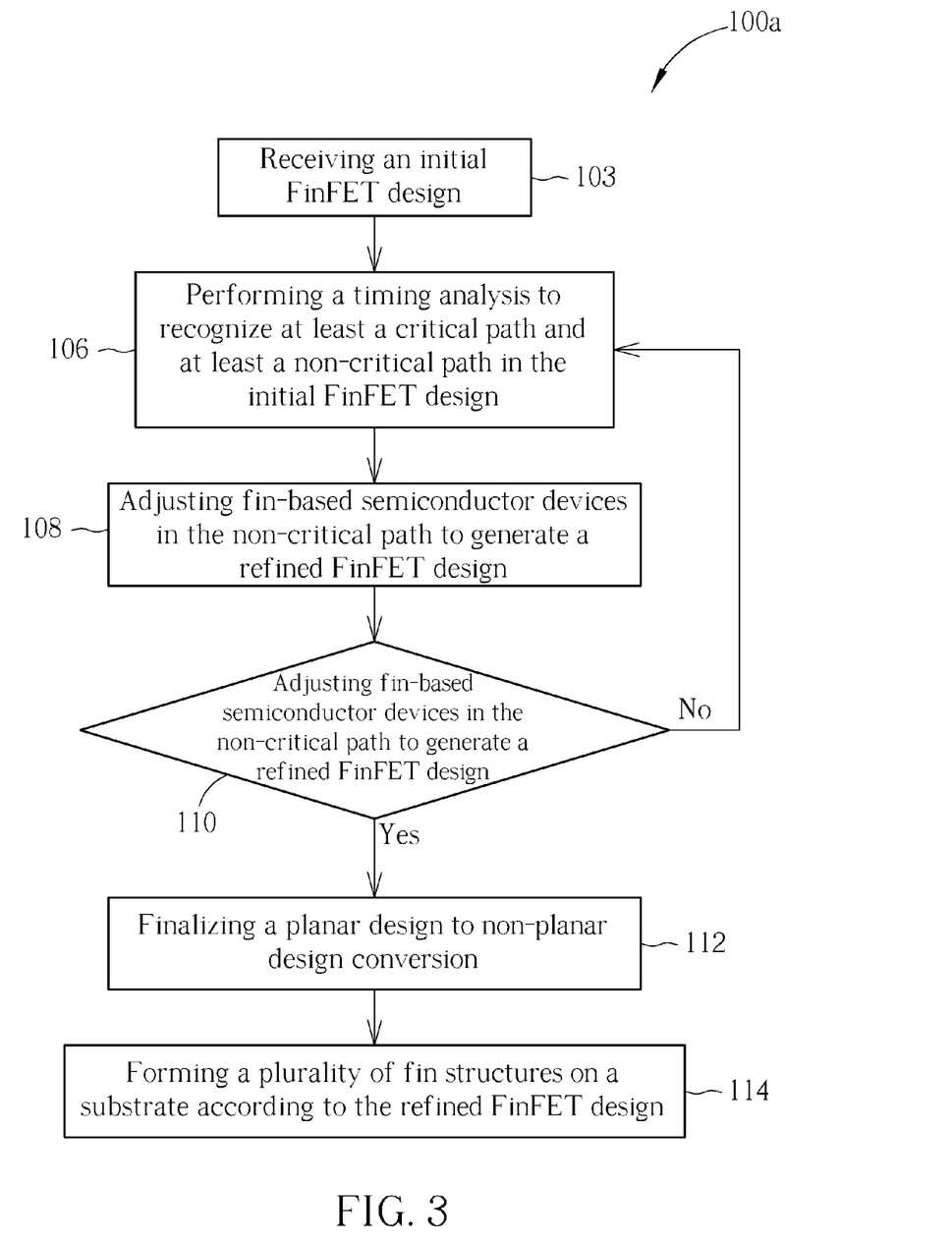
FIG. 3 is a flowchart of a method of designing a fin-based transistor provided by a modification to the present invention.

Advert to FIG. 3, which is a flowchart of a method of designing a fin-based transistor 100a provided by a modification to the present invention. As mentioned above, the modification can be performed in a CAD platform. The difference between the method of designing the fin-based transistor 100a provided by the modification and the method of designing the fin-based transistor 100 provided by the aforementioned description is: The method of designing the fin-based transistor 100a includes the following step:

Step 103: Receiving an initial FinFET design

According to the method of designing a fin-based transistor 100a provided by the modification, an initial FinFET design is received. The initial FinFET design includes a plurality of fin-based semiconductor devices, and the fin-based semiconductor devices include a plurality of initial fins. Next, Steps 106-114 are performed. It is noteworthy that since Steps 106-114 in the method of designing the fin-based transistor 100a are the same with Steps 106-114 in the method of designing the fin-based transistor 100, those details are omitted in the interest of brevity. According to the modification, it is conceivable that the method of designing the fin-based transistor provided by the present invention can be adopted not only in planar design to non-planar design conversion, but also in present FinFET design for power optimization.

Figure 4:
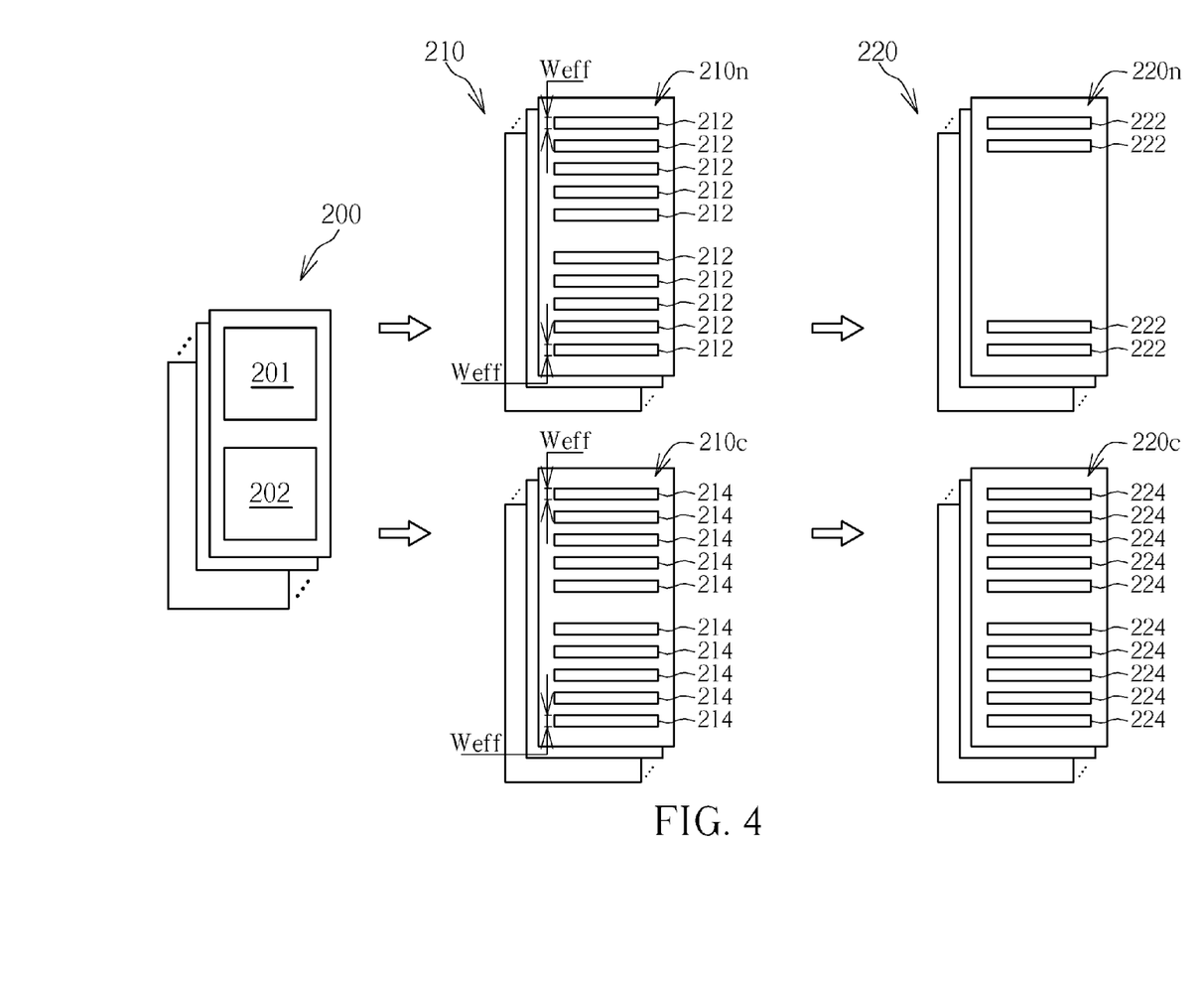
FIG. 4 is a schematic drawing illustrating the method of designing a fin-based transistor provided by a first preferred embodiment of the present invention.

Next, approaches for adjusting the fin-based semiconductor devices on the non-critical path according to the method of designing the fin-based transistor provided by the present invention are detailed. Please refer to FIG. 4, which is a schematic drawing illustrating the method of designing the fin-based transistor provided by a first preferred embodiment of the present invention. As shown in FIG. 4, Step 102 is performed in a platform and a planar-FET design 200 is received. The planar-FET design 200 includes layout patterns of a plurality of planar semiconductor devices. For example, the planar-FET design 200 can include a plurality of diffusion regions 201 for p-typed FETs (p-FETs) and/or a plurality of diffusion regions 202 for n-typed FETs (n-FETs) in the preferred embodiment. It should be understood that the planar-FET design 200 can also include layout patterns for gate electrodes and connection layers. But those layout patterns for gate electrodes and connection layers are omitted from FIG. 4 for clarifying the changes in the diffusion regions 201 and 202. Step 104 is then performed: An initial FinFET design 210 is generated. The initial FinFET design 210 includes a plurality of fin-based semiconductor devices, and the fin-based semiconductor devices are formed correspondingly to the abovementioned planar semiconductor devices. As shown in FIG. 4, the diffusion regions 201 and 202 are converted into a plurality of initial fins in the initial FinFET design 210. Additionally, an initial FinFET design 210 including a plurality of initial fins can be received by performed Step 103 of the method of designing the fin-based transistor 100a provided by the modification.

Next, Step 106 is performed: A timing analysis is performed to recognize at least a critical path 210c and at least a non-critical path 210n in the initial FinFET design 210. The critical path 210c and the non-critical path 210n include at least one of the fin-based semiconductor devices respectively. It is noteworthy that though only one fin-based semiconductor device on the critical path 210c and only one fin-based semiconductor device on the non-critical path 210n are depicted in FIG. 4, those skilled in the art would easily realize that amounts of the devices on the critical path and the non-critical path are not limited by FIG. 4. Furthermore, the fin-based semiconductor device on the non-critical path 210n of the initial FinFET design 210 includes a plurality of initial fins 212, and the fin-based semiconductor device on the critical path 210c of the initial FinFET design 210 includes a plurality of initial fins 214.

Please refer to FIG. 4 again. Step 108 is then performed: The fin-based semiconductor device on the non-critical path 210n is adjusted. Please refer to Equation 2 and Equation 3 again. According to Equation 2, it is observed that the power consumption of the FinFET design is related with the sum of total current $I_{ds}$. And according to Equation 3, it is observed that the sum of total current $I_{ds}$ is related with the effective width $W_{eff}$ of the fins and the amount of the fins. In the preferred embodiment, an amount of the initial fins 212 is adjusted for modulating the sum of total current $I_{ds}$. As shown in FIG. 4, the amount of initial fins 212 of the fin-based semiconductor device on the non-critical path 210n is reduced according to Step 108 of the preferred embodiment. Consequently, a refined FinFET design 220 is obtained. The refined FinFET design 220 also includes at least a critical path 220c and at least a non-critical path 220n. More important, the fin-based semiconductor device on the non-critical path 220n of the refined FinFET design 220 includes a plurality of refined fins 222, and an amount of the refined fins 222 is smaller than an amount of the initial fins 212. It is also noteworthy that an amount of the refined fins 224 on the critical path 220c of the refined FinFET design 220 is the same with an amount of the initial fins 214 on the critical path 210c of the initial FinFET design 210, so that the sensitive critical path 220c remains impervious.

Please still refer to FIG. 4. After obtaining the refined FinFET design 220 by performing Step 108 in the computer device or platform, Steps 110-114 are performed: Performing a timing analysis to verify that the refined FinFET design 220 meet a design rule and finalizing a planar design to non-planar design conversion. Next, the refined FinFET design 220 is outputted from the computer or the platform. And a plurality of fin structure are formed on a substrate according to the refined FinFET design 220.

According to the method of designing the fin-based transistor provided by the preferred embodiment, the amount of the fins of the fin-based semiconductor device on the non-critical path is adjusted after recognizing the non-critical path and the critical path. Accordingly, the amount of the refined fins 222 in the refined FinFET design 220 is smaller than the amount of the initial fins 212 in the initial FinFET design 210. Therefore the sum of total current $I_{ds}$ is lowered. In other words, a current required by the refined FinFET design 220 is lower than a current required by the initial FinFET design 210. And thus power optimization is easily and efficaciously achieved. More important, since the logic gates in the non-critical path is less, the fins of the fin-based semiconductor device on the non-critical path with reduced amount makes the fin-based semiconductor device requires more performance time, and thus timing delay of the non-critical path is increased. However, the whole performance time is not increased because the sensitive critical path is impervious in the preferred embodiment. Therefore power optimization is easily achieved without impacting the electrical performance of the whole circuits according to the method of designing the fin-based transistor provided by the preferred embodiment.

Figure 5:
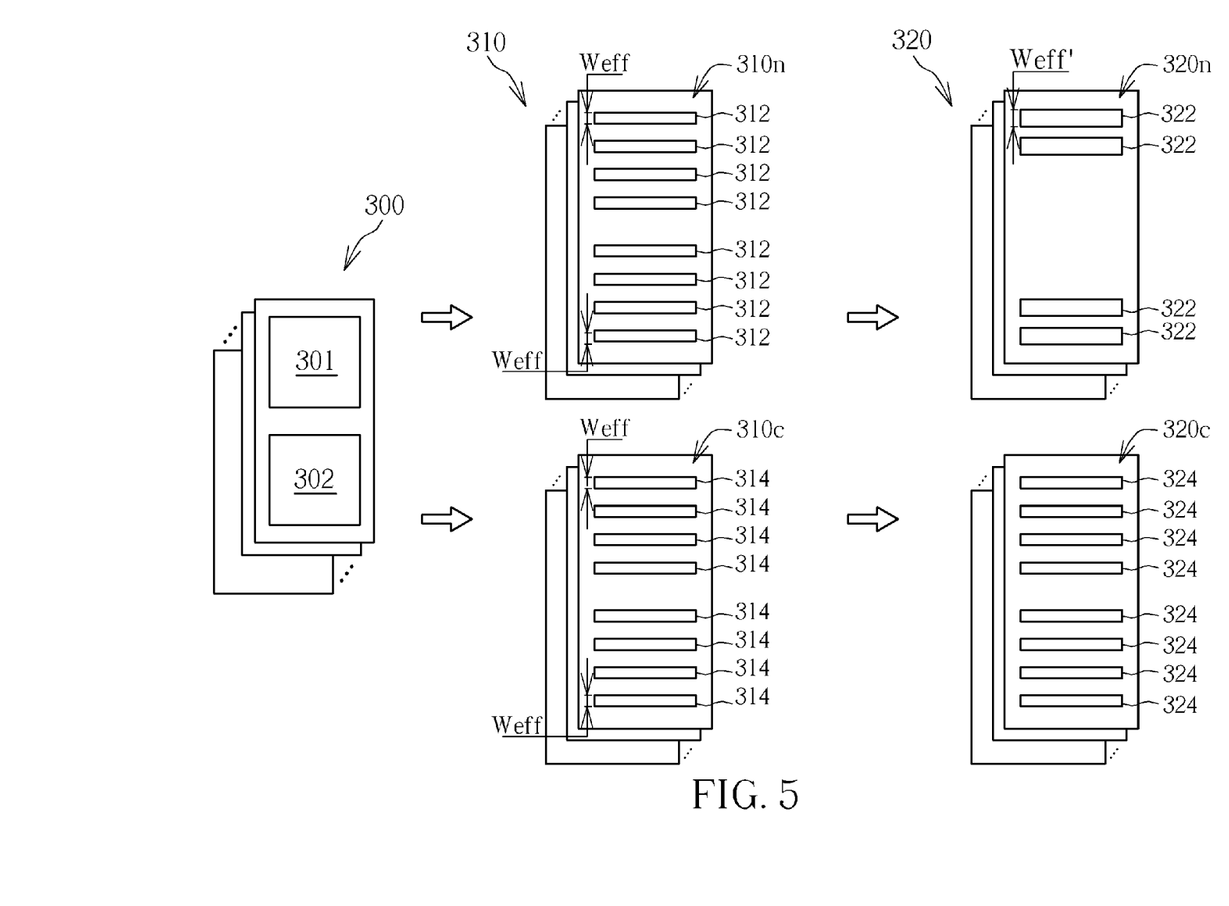
FIG. 5 is a schematic drawing illustrating the method of designing a fin-based transistor provided by a second preferred embodiment of the present invention.

Next, another approach for adjusting the fin-based semiconductor devices in the non-critical path according to the method of designing a fin-based transistor provided by the present invention is detailed. Please refer to FIG. 5, which is a schematic drawing illustrating the method of designing the fin-based transistor provided by a second preferred embodiment of the present invention. As shown in FIG. 5, Step 102 is performed in a platform and a planar-FET design 300 is received. The planar-FET design 300 includes layout patterns of a plurality of planar semiconductor devices. For example, the planar-FET design 300 can include a plurality of diffusion regions 301 for p-FETs and/or a plurality of diffusion regions 302 for n-FETs according to the preferred embodiment. It should be understood that the planar-FET design 300 can also include layout patterns for gate electrodes and connection layers. But those layout patterns for gate electrodes and connection layers are omitted from FIG. 5 for clarifying the changes in the diffusion regions 301 and 302. Step 104 is then performed and an initial FinFET design 310 is generated. The initial FinFET design 310 includes a plurality of fin-based semiconductor devices, and the fin-based semiconductor devices are formed correspondingly to the abovementioned planar semiconductor devices. As shown in FIG. 5, the diffusion regions 301 and 302 are converted into a plurality of initial fins in the initial FinFET design 310. Additionally, an initial FinFET design 310 including a plurality of initial fins can be received by performing Step 103 of the method of designing the fin-based transistor 100a provided by the modification.

Next, Step 106 is performed: A timing analysis is performed to recognize at least a critical path 310c and at least a non-critical path 310n in the initial FinFET design 310. The critical path 310c and the non-critical path 310n include at least one of the fin-based semiconductor devices, respectively. It is noteworthy that though only one fin-based semiconductor device on the critical path 210c and only one fin-based semiconductor device on the non-critical path 210n are depicted in FIG. 5, those skilled in the art would easily realize that amounts of the devices on the critical path and the non-critical path are not limited by FIG. 5. Furthermore, the fin-based semiconductor device on the non-critical path 310n of the initial FinFET design 310 includes a plurality of initial fins 312, and the fin-based semiconductor device on the critical path 310c of the initial FinFET design 310 includes a plurality of initial fins 314.

Please refer to FIG. 5 again. Step 108 is then performed: The fin-based semiconductor device on the non-critical path 310n is adjusted. Please refer to Equation 2 and Equation 3 again. According to Equation 2, it is observed that the power consumption of the FinFET design is related with the sum of total current $I_{ds}$. And according to Equation 3, it is observed that the sum of total current $I_{ds}$ is related with the effective width $W_{eff}$ of the fins and an amount of the fins. In the preferred embodiment, a width $W_{eff}$ of the initial fins 312 is adjusted for modulating the sum of total current $I_{ds}$. As shown in FIG. 5, the width $W_{eff}$ of initial fins 312 of the fin-based semiconductor device on the non-critical path 310n is increased according to Step 108 of the preferred embodiment. Consequently, a refined FinFET design 320 is obtained. The refined FinFET design 320 also includes at least a critical path 320c and at least a non-critical path 320n. More important, the fin-based semiconductor device on the non-critical path 320n of the refined FinFET design 320 includes a plurality of refined fins 322, and a width $W_{eff}'$ of the refined fins 322 is larger than a width $W_{eff}$ of the initial fins 312. It is also noteworthy that a width $W_{eff}$ of the refined fins 324 on the critical path 320c of the refined FinFET design 320 is the same with a with $W_{eff}$ of the initial fins 314 on the critical path 310c of the initial FinFET design 310, so that the sensitive critical path 320c remains impervious.

Please still refer to FIG. 5. After obtaining the refined FinFET design 320 by performing Step 108 in the computer device or platform, Steps 110-114 are performed: Performing a timing analysis to verify that the refined FinFET design 320 meet a design rule and finalizing a planar design to non-planar design conversion. Next, the refined FinFET design 320 is outputted from the computer or the platform. And a plurality of fin structures are formed on a substrate according to the refined FinFET design 320.

Additionally, a modification to the second preferred embodiment is provided: As shown in FIG. 5, after recognizing the non-critical path 310n and the critical path 310c in the initial FinFET design 310, an amount of the fins of the fin-based semiconductor device on the non-critical path 310n is adjusted and followed by adjusting a width of the fins. Specifically speaking, the amount of the initial fins 312 of the fin-based semiconductor device on the non-critical path 310n is reduced and followed by increasing the width of initial fins 312 of the fin-based semiconductor device on non-critical path 310n, and thus the refined FinFET design 320 including the less and fatter refined fins 322 is obtained. According to the modification, flexibility of power reduction control in the non-critical path is further improved.

According to the method of designing the fin-based transistor provided by the second preferred embodiment and its modification, the amount of the fins of the fin-based semiconductor device on the non-critical path is reduced for substantially lowering the sum of total current $I_{ds}$ after recognizing the non-critical path and the critical path. Next, the width of the fins of the fin-based semiconductor device on the non-critical path is adjusted. Therefore the width $W_{eff}'$ of the refined fins 322 in the refined FinFET design 320 is larger than the width $W_{eff}$ of the initial fins 312 in the initial FinFET design 310. Consequently the sum of total current $I_{ds}$ is a little increased. Such adjustments to the fins make the power reduction control on the non-critical path more flexible. Eventually, current required by the refined FinFET design 320 is lower than a current required by the initial FinFET design 310, and thus power optimization is easily and efficaciously achieved. More important, since the logic gates on the non-critical path is less, the fins of the fin-based semiconductor device on the non-critical path with increased width makes the fin-based semiconductor device requires more performance time, and thus timing delay of the non-critical path is increased. However, the whole performance time is not increased because the sensitive critical path is impervious in the preferred embodiment. Therefore power optimization is easily achieved without impacting the electrical performance of the whole circuits according to the method of designing the fin-based transistor provided by the preferred embodiment.

Figure 6:
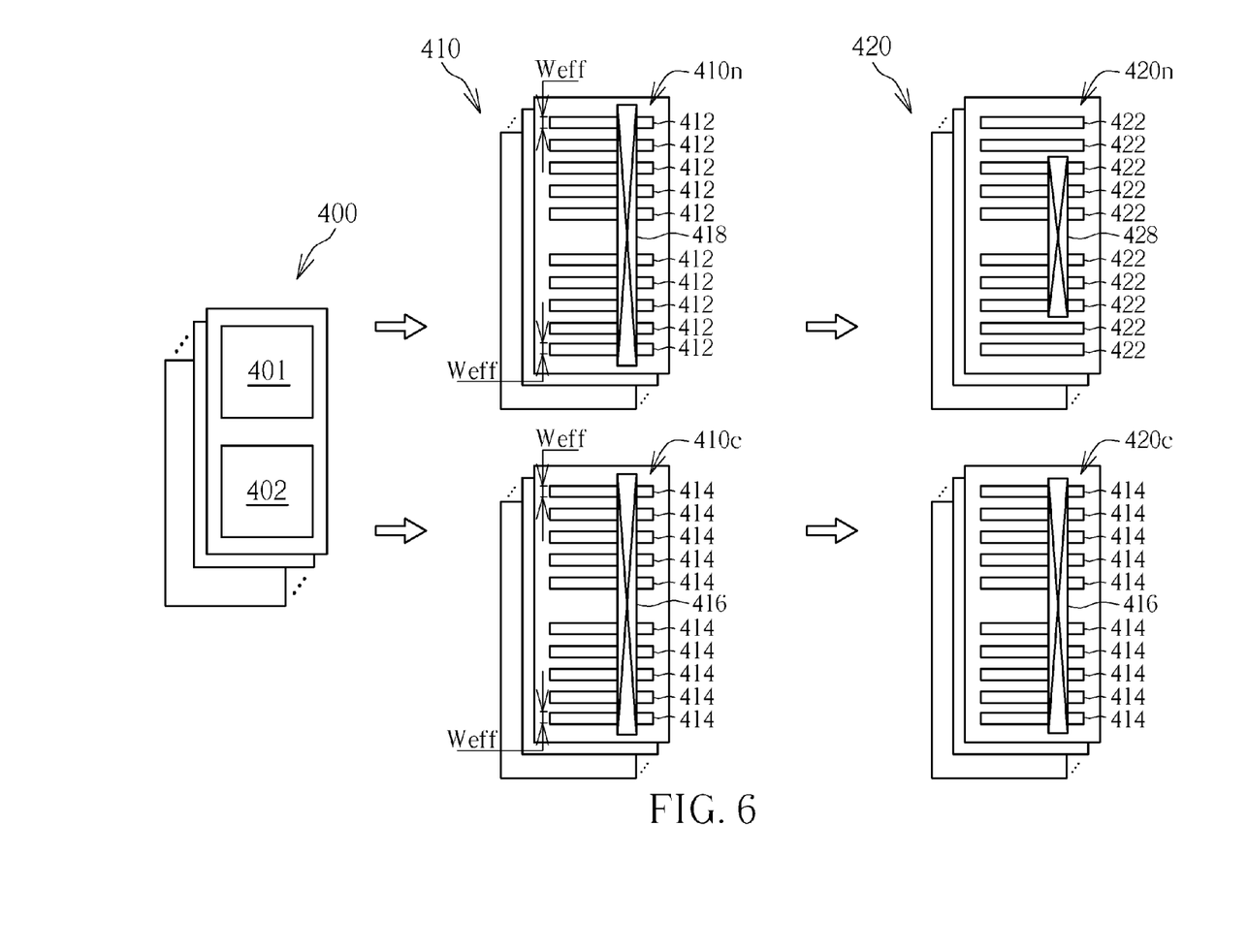
FIG. 6 is a schematic drawing illustrating the method of designing a fin-based transistor provided by a third preferred embodiment of the present invention.

Next, still another approach for adjusting the fin-based semiconductor devices in the non-critical path according to the method of designing the fin-based transistor provided by the present invention is detailed. Please refer to FIG. 6, which is a schematic drawing illustrating the method of designing the fin-based transistor provided by a third preferred embodiment of the present invention. As shown in FIG. 6, Step 102 is performed in a platform and a planar-FET design 400 is received. The planar-FET design 400 includes layout patterns of a plurality of planar semiconductor devices. For example, the planar-FET design 400 can include a plurality of diffusion regions 401 for p-FETs, a plurality of diffusion regions 402 for n-FETs, and plurality of connection layers according to the preferred embodiment. It should be understood that the planar-FET design 400 can also include layout patterns for gate electrodes. But the layout pattern for gate electrodes is omitted from FIG. 6 for clarifying the changes in the diffusion regions 401/402 and the connection layers. Step 104 is then performed and an initial FinFET design 410 is generated. The initial FinFET design 410 includes a plurality of fin-based semiconductor devices, and the fin-based semiconductor devices are formed correspondingly to the abovementioned planar semiconductor devices. As shown in FIG. 6, the diffusion regions 401 and 402 are converted into a plurality of initial fins in the initial FinFET design 410. Furthermore, the initial FinFET design 410 includes initial connection layers 416 and 418 for drains. Additionally, an initial FinFET design 410 including a plurality of initial fins and initial connection layers 416 and 418 can be received by performing Step 103 of to the method of designing the fin-based transistor 100a provided by the modification.

Next, Step 106 is performed: A timing analysis is performed to recognize at least a critical path 410c and at least a non-critical path 410n in the initial FinFET design 410. The critical path 410c and the non-critical path 410n include at least one of the fin-based semiconductor devices, respectively. It is noteworthy that amounts of the fin-based semiconductor device on the critical path 410c and on the non-critical path 410n are only exemplarily depicted in FIG. 6, but not limited thereby. As shown in FIG. 6, the fin-based semiconductor device on the non-critical path 410n includes a plurality of initial fins 412, and the fin-based semiconductor device on the critical path 410c includes a plurality of initial fins 414. Furthermore, an initial connection layer 418 is formed on the non-critical path 410n for constructing electrical connection to all of the initial fins 412, and an initial connection layer 416 is formed on the critical path 410c for constructing electrical connection to all of the initial fins 414.

Please refer to FIG. 6 again. Step 108 is then performed: The fin-based semiconductor device on the non-critical path 410n is adjusted. Please refer to Equation 2 and Equation 3 again. According to Equation 2, it is observed that the power consumption of the FinFET design is related with the sum of total current $I_{ds}$. And according to Equation 3, it is observed that the sum of total current $I_{ds}$ is related with the effective width $W_{eff}$ of the fins and an amount of the fins. In the preferred embodiment, an amount of the fins being electrically connected together is adjusted for modulating the sum of total current $I_{ds}$. As shown in FIG. 6, the amount of initial fins 412 of the fin-based semiconductor device on the non-critical path 410n being electrically connected together is reduced according to Step 108 of the preferred embodiment. Consequently, a refined FinFET design 420 is obtained. The refined FinFET design 420 also includes at least a critical path 420c and at least a non-critical path 420n. The fin-based semiconductor device on the non-critical path 420n of the refined FinFET design 420 includes a plurality of refined fins 422 and a refined connection layer 428. More important, an amount of the refined fins 422 being electrically connected together by the refined connection layer 428 in the refined FinFET design 420 is smaller than the amount of the initial fins 412 being electrically connected together by the initial connection layer 418 in the initial FinFET design 410. In other words, by adjusting the connection layer, the amount of the fins being electrically connected is adjusted. Furthermore, an amount of the refined fins 424 being electrically connected in the critical path 420c of the refined FinFET design 420 is the same with an amount of the initial fins 414 being electrically connected in the critical path 410c of the initial FinFET design, 410 so that the sensitive critical path 420c remains impervious.

Please still refer to FIG. 6. After obtaining the refined FinFET design 420 by performing Step 108 in the computer device or platform, Steps 110-114 are performed: Performing a timing analysis to verify that the refined FinFET design 420 meet a design rule and finalizing a planar design to non-planar design conversion. Next, the refined FinFET design 420 is outputted from the computer or the platform. And a plurality of fin structure are formed on a substrate according to the refined FinFET design 420.

It is noteworthy that the initial fins 412 in the initial FinFET design 410 are all electrically connected together and the initial fins 414 in the initial FinFET design 410 are all electrically connected together according to FIG. 6, however those skilled in the art would easily realize that the amounts of the fins 412/414 being electrically connected together are not limited by FIG. 6. In other words, the amounts of the fins 412/414 being electrically connected together can be different depending on different product requirements. However, the amount of the refined fins 422 being electrically connected by the refined connection layer 428 in the refined FinFET design 420 is always smaller than the amount of the initial fins 412 being electrically connected by the initial connection layer 418 in the initial FinFET design 410.

According to the method of designing the fin-based transistor provided by the preferred embodiment, the connection layer of the fin-based semiconductor device on the non-critical path is individually and independently adjusted after recognizing the non-critical path and the critical path. Accordingly, the amount of the refined fins 422 being electrically connected by the refined connection layer 428 is smaller than the amount of the initial fins 412 being electrically connected by the initial connection layer 418. Thus fins having practical function are reduced and therefore the sum of total current $I_{ds}$ is lowered. In other words, a current required by the refined FinFET design 420 is lower than a current required by the initial FinFET design 410. And thus power optimization is easily and efficaciously achieved. More important, since the logic gates on the non-critical path is less, the fins having practical function of the fin-based semiconductor device on the non-critical path with reduced amount makes the fin-based semiconductor device requires more performance time, and thus timing delay of the non-critical path is increased. However, the whole performance time is not increased because the sensitive critical path is impervious in the preferred embodiment. Therefore power optimization is easily achieved without impacting the electrical performance of the whole circuits according to the method of designing the fin-based transistor provided by the preferred embodiment.

Figure 7:
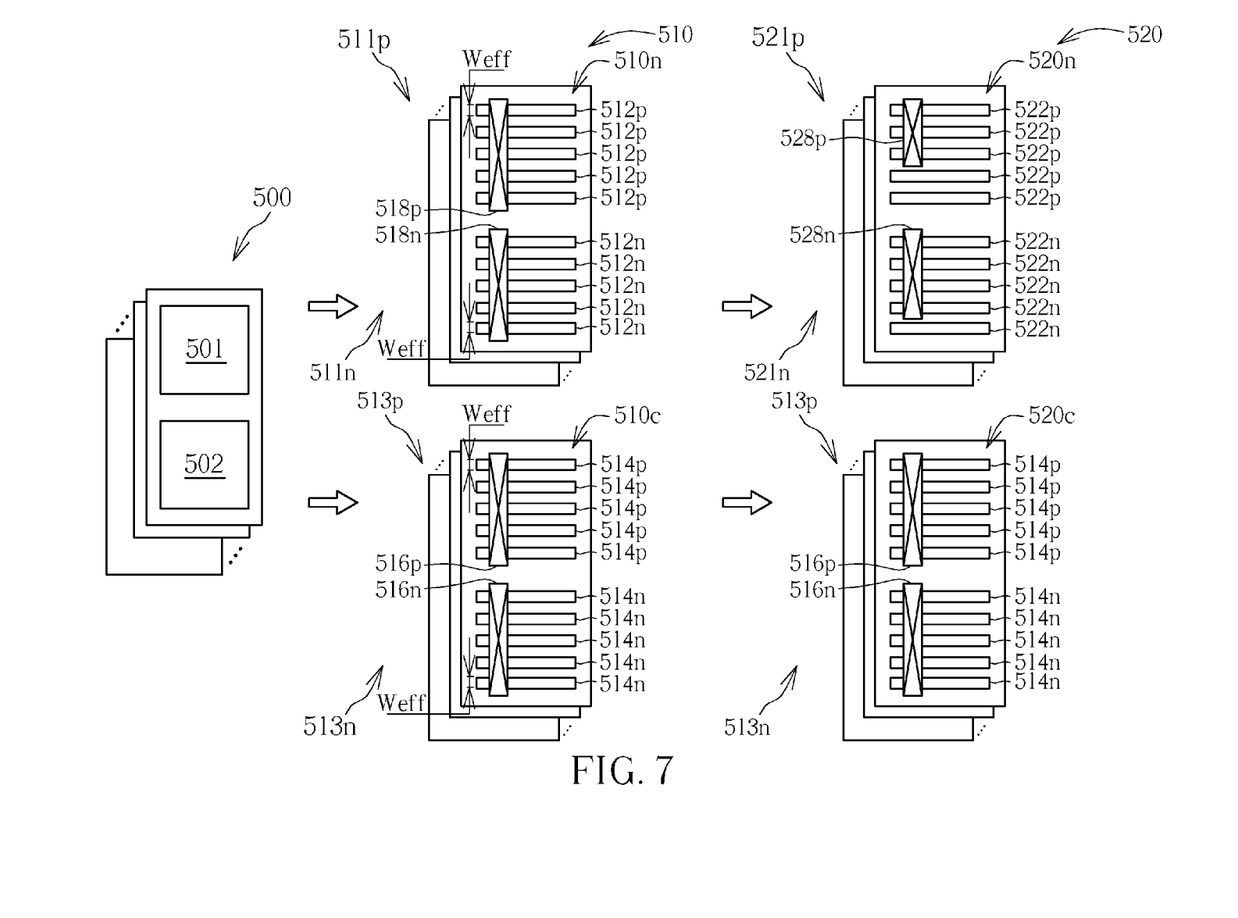
FIG. 7 is a schematic drawing illustrating the method of designing a fin-based transistor provided by a fourth preferred embodiment of the present invention.

Next, still another approach for adjusting the fin-based semiconductor devices in the non-critical path according to the method of designing the fin-based transistor provided by the present invention is detailed. Please refer to FIG. 7, which is a schematic drawing illustrating the method of designing the fin-based transistor provided by a fourth preferred embodiment of the present invention. As shown in FIG. 7, Step 102 is performed in a platform and a planar-FET design 500 is received. The planar-FET design 500 includes layout patterns of a plurality of planar semiconductor devices. For example, the planar-FET design 500 can include a plurality of diffusion regions 501 for p-FETs, a plurality of diffusion regions 502 for n-FETs, and a plurality of connection layers according to the preferred embodiment. It should be understood that the planar-FET design 500 can also include layout pattern for gate electrodes. But the layout pattern for gate electrodes is omitted from FIG. 7 for clarifying the changes in the diffusion regions 501/502 and the connection layers. Step 104 is then performed and an initial FinFET design 510 is generated. As shown in FIG. 7, the diffusion regions 501 and 502 in the initial FinFET design 510 are converted into a plurality of initial fins in the initial FinFET design 510.

Next, Step 106 is performed: A timing analysis is performed to recognize at least a critical path 510c and at least a non-critical path 510n in the initial FinFET design 510. The critical path 510c and the non-critical path 510n include at least one of the fin-based semiconductor devices, respectively. It is noteworthy that amounts of the fin-based semiconductor device on the critical path 510c and on the non-critical path 510n are only exemplarily depicted in FIG. 7, but not limited thereby. More important, the fin-based semiconductor device on the non-critical path 510n includes a p-type FinFET (p-FinFET) 511p and an n-typed FinFET (n-FinFET) 511n according to the preferred embodiment. The p-FinFET 511p on the non-critical path 510n includes a plurality of initial p-fins 512p and an initial source connection layer 518p. And the n-FinFET 511n on the non-critical path 510n includes a plurality of initial n-fins 512n and an initial source connection layer 518n. In the initial FinFET design 510 of the preferred embodiment, all of the initial p-fins 512p on the source side are electrically connected by the initial source connection layer 518p, and all of the initial n-fins 512n on the source side are electrically connected by the initial source connection layer 518n. Additionally, the fin-based semiconductor device on the critical path 510c also includes a p-FinFET 513p and an n-FinFET 513n. The p-FinFET 513p on the critical path 510c includes a plurality of initial p-fins 514p and an initial source connection layer 516p. And the n-FinFET 513n on the critical path 510c includes a plurality of initial n-fins 514n and an initial source connection layer 516n. In the initial FinFET design 510 of the preferred embodiment, all of the initial p-fins 514p on the source side are electrically connected by the initial source connection layer 516p, and all of the initial n-fins 514n on the source side are electrically connected by the initial source connection layer 516n.

Please refer to FIG. 7 again. Step 108 is then performed: The fin-based semiconductor device on the non-critical path 510n is adjusted. Please refer to Equation 2 and Equation 3 again. According to Equation 2, it is observed that the power consumption of the FinFET design is related with the sum of total current $I_{ds}$. And according to Equation 3, it is observed that the sum of total current $I_{ds}$ is related with the effective width $W_{eff}$ of the fins and an amount of the fins. In the preferred embodiment, an amount of the fins being electrically connected together is adjusted for modulating the sum of total current $I_{ds}$. As shown in FIG. 7, the amount of fins of the fin-based semiconductor device on the non-critical path 510n being electrically connected together is reduced according to Step 108 of the preferred embodiment. Consequently, a refined FinFET design 520 is obtained. In detail, the refined FinFET design 520 also includes a critical path 520c and a non-critical path 520n, the fin-based semiconductor device on the non-critical path 520n includes a p-FinFET 521p and an n-FinFET 521n. The p-FinFET 521p includes a plurality of refined p-fins 522p and a refined source connection layer 528p, and the n-FinFET 521n includes a plurality of refined n-fins 522n and a refined source connection layer 528n. It is noteworthy that lengths of the refined source connection layers 528p and 528n are individually and independently adjusted according to the preferred embodiment. Therefore, an amount the refined p-fins 522p being electrically connected together is smaller than an amount of initial p-gins 512p being electrically connected together. In the same concept, an amount the refined n-fins 522n being electrically connected together is smaller than an amount of initial n-fins 512n being electrically connected together. It is also noteworthy that the p-FinFET 513p and the n-FinFET 513n on the critical path 520c of the refined FinFET design 520 are not adjusted according to the preferred embodiment. Therefore in the critical path 520c of the refined FinFET design 520 remains impervious.

Please still refer to FIG. 7. After obtaining the refined FinFET design 520 by performing Step 108 in the computer device or platform, Steps 110-114 are performed: Performing a timing analysis to verify that the refined FinFET design 520 meet a design rule and finalizing a planar design to non-planar design conversion. Next, the refined FinFET design 520 is outputted from the computer and the platform. And a plurality of fin structure are formed on a substrate according to the refined FinFET design 520.

It is noteworthy that though the initial p-fins 512p in the initial FinFET design 510 are all electrically connected together and the initial n-fins 512n in the initial FinFET design 510 are all electrically connected together according to FIG. 7, those skilled in the art would easily realize that the amounts of the fins 512p/512n being electrically connected together are not limited by FIG. 7. In other words, the amounts of the fins 512p/512n being electrically connected together can be different depending on different product requirements. However, the amount of the refined p-fins 522p being electrically connected by the refined source connection layer 528p in the refined FinFET design 520 is always smaller than the amount of the initial p-fins 512p being electrically connected by the initial connection layer 518p in the initial FinFET design 510. Also, the amount of the refined n-fins 522n being electrically connected by the refined source connection layer 528n in the refined FinFET design 520 is always smaller than the amount of the initial p-fins 512n being electrically connected by the initial connection layer 518n in the initial FinFET design 510. More important, the preferred embodiment individually provides the refined source connection layer 528p for constructing electrical connection in the refined p-fins 522p and the refined source connection layer 528n for constructing electrical connection in the refined p-fins 522n. Therefore the amount of the refined p-fins 522p be electrically connected together can be the same or different from the amount of the refined n-fins 522n be electrically connected together, depending on different product requirements. That is, currents required by the p-FinFET 521p and the n-FinFET 521n can be individually and independently modulated. Additionally, the critical path 520c of the refined FinFET design 520 is not adjusted and thus the sensitive critical path 520c remains impervious.

According to the method of designing the fin-based transistor provided by the preferred embodiment, the connection layers of the fin-based semiconductor device on the non-critical path are individually and independently adjusted after recognizing the non-critical path and the critical path. Accordingly, the amount of the refined p-fins 522p being electrically connected together and the amount of the refined n-fins 522n being electrically connected together can be individually and independently adjusted. Thus fins having practical function are reduced and therefore the sum of total current $I_{ds}$ is lowered. In other words, a current required by the refined FinFET design 520 is lower than a current required by the initial FinFET design 510. And thus power optimization is easily and efficaciously achieved. More important, since the logic gates on the non-critical path is less, the fins having practical function of the fin-based semiconductor device on the non-critical path with reduced amount makes the fin-based semiconductor device requires more performance time, and thus timing delay of the non-critical path is increased. However, the whole performance time is not increased because the sensitive critical path is impervious in the preferred embodiment. Therefore power optimization is easily achieved without impacting the electrical performance of the whole circuits according to the method of designing the fin-based transistor provided by the preferred embodiment.

Figure 8:
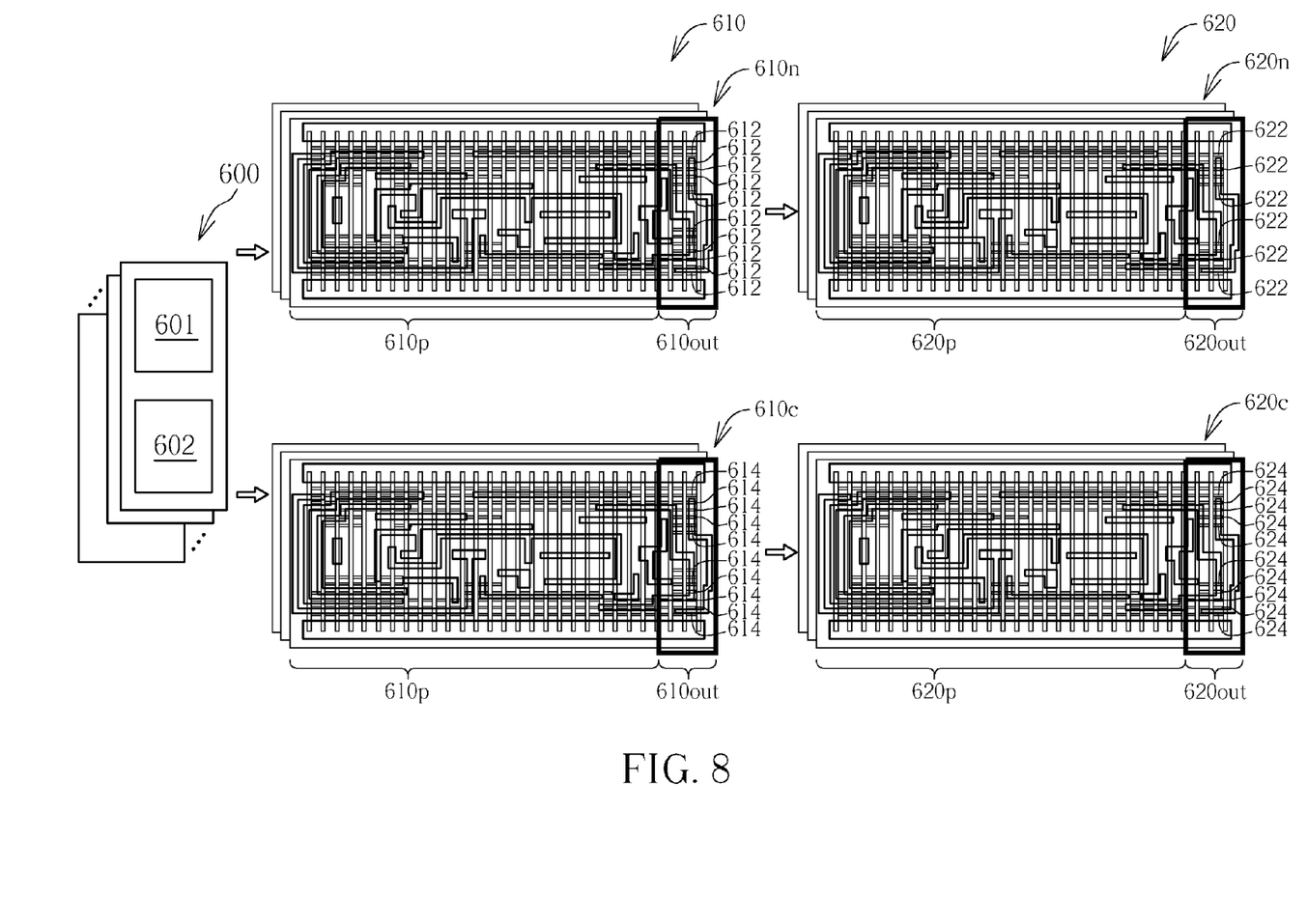
FIG. 8 is a schematic drawing illustrating the method of designing a fin-based transistor provided by a fifth preferred embodiment of the present invention.

Next, still another approach for adjusting the fin-based semiconductor devices in the non-critical path according to the method of designing the fin-based transistor provided by the present invention is detailed. Please refer to FIG. 8, which is a schematic drawing illustrating the method of designing the fin-based transistor provided by a fifth preferred embodiment of the present invention. As shown in FIG. 8, Step 102 is performed in a platform and a planar-FET design is received. The planar-FET design includes layout patterns of a plurality of planar semiconductor devices. For example, the planar-FET design can include a plurality of diffusion regions 601 for p-FETs, a plurality of diffusion regions 602 for n-FETs, gate electrode for p-FETs/n-FETs, and connection layers. Step 104 is then performed and an initial FinFET design 610 is generated. As shown in FIG. 8, the diffusion regions in the planar-FET design are converted into a plurality of initial fins in the initial FinFET design 610. Additionally, an initial FinFET design 610 including a plurality of initial fins can be received by performed Step 103 of the method of designing the fin-based transistor 100a provided by the modification. Generally speaking, a standard cell layout includes a logic operation region and logic output region. As shown in FIG. 8, the initial FinFET design 610 includes a logic operation region 610p and a logic output region 610out.

Next, Step 106 is performed: A timing analysis is performed to recognize at least a critical path 610c and at least a non-critical path 610n in the initial FinFET design 610. As shown in FIG. 8, the critical path 610c and the non-critical path 610n include a plurality of fin-based semiconductor devices, respectively. In detail, the fin-based semiconductor devices in the critical path 610c respectively include a plurality of initial fins, and the fin-based semiconductor devices in the non-critical path 610n respectively include a plurality of initial fins. More important, the critical path 610c and the non-critical path 610n respectively include an output terminal. The output terminal on the non-critical path 610n includes a plurality of initial output fins 612, and the output terminal on the critical path 610c includes a plurality of initial output fins 614.

Please refer to FIG. 8 again. Step 108 is then performed: The fin-based semiconductor device on the non-critical path 610n is adjusted. Please refer to Equation 2 and Equation 3 again. According to Equation 2, it is observed that the power consumption of the FinFET design is related with the sum of total current $I_{ds}$. And according to Equation 3, it is observed that the sum of total current $I_{ds}$ is related with the effective width $W_{eff}$ of the fins and the amount of the fins. In the preferred embodiment, an amount of the initial output fins 612 on the non-critical path 610n is adjusted in for modulating the sum of total current $I_{ds}$. As shown in FIG. 8, the amount of initial output fins 612 on the non-critical path 610n is reduced according to Step 108 of the preferred embodiment. Consequently, a refined FinFET design 620 is obtained. More important, the refined FinFET design 620 includes at least a non-critical path 620n, and the non-critical path 620n includes a plurality of refined output fins 622. An amount of the refined output fins 622 is smaller than an amount of the initial output fins 612. It is also noteworthy that an amount of the refined output fins 624 on the critical path 620c of the refined FinFET design 620 is the same with an amount of the initial output fins 614 on the critical path 610c of the initial FinFET design 610 so that the sensitive critical path 620c remains impervious.

Please still refer to FIG. 8. After obtaining the refined FinFET design 620 by performing Step 108 in the computer device or platform, Steps 110-114 are performed: Performing a timing analysis to verify that the refined FinFET design 620 meet a design rule and finalizing a planar design to non-planar design conversion. Next, the refined FinFET design 620 is outputted from the computer and the platform. And a plurality of fin structure are formed on a substrate according to the refined FinFET design 620.

The present invention includes a modification to the abovementioned the preferred embodiment. According to the modification, the amount of the initial output fins 612 in the logic output region 610out on the non-critical path 610n is adjusted after recognizing the non-critical path 610n and the critical path 610c, and followed by adjusting a width of the initial output fins 612. That is, the amount of the initial output fins 612 in the logic output region 610out on the non-critical path 610n is reduced and followed by increasing the width of the initial output fins 612 in the logic output region 610out on the non-critical path 610n. And thus the refined FinFET design 620 including the less and fatter refined output fins 622 is obtained. The instant modification is similar to the abovementioned second preferred embodiment and therefore those details are omitted in the interest of brevity.

The present invention includes another modification to the abovementioned the preferred embodiment. According to the modification, a connection layer is provided to electrically connect the refined output fins 622. More important, an amount the refined output fins 622 being electrically connected together by the connection layer in the output region 620out on the non-critical path 620n of the refined FinFET design 620 is smaller than an amount the initial output fins 612 being electrically connected together by the connection layer in the output region 610out on the non-critical path 610n of the initial FinFET design 610. Accordingly, fins having practical function are reduced and therefore the sum of total current $I_{ds}$ on the non-critical path 620n of the refined FinFET design 620 is lowered. The instant modification is similar to the abovementioned third preferred embodiment and therefore those details are omitted in the interest of brevity.

According to the method of designing the fin-based transistor provided by the preferred embodiment, the amount of the output fins in the logic output region on the non-critical path, the width the output fins in the logic output region on the non-critical path, and/or the amount of the output fins being electrically connected together in the logic output region on the non-critical path are adjusted after recognizing the non-critical path and the critical path. Thus the sum of total current $I_{ds}$ required by the non-critical path is lowered, and therefore a current required by the refined FinFET design 620 is lower than a current required by the initial FinFET design 610. Consequently power optimization is easily and efficaciously achieved. More important, only the output fins 612 in the logic output region 610out on the non-critical path 610n are adjusted but other fins in the logic operation region 610p on the non-critical path 610n are not adjusted. It is should be understood that an amount of the fins in the logic operation region 610p is smaller than the amount of the output fins in the logic output region 610out, therefore the output fins in the logic output region 610out serve as suitable and proper subject for modulation. Therefore, only the amount of the output fins in the logic output region on the non-critical path, the width of the output fins in the logic output region on the non-critical path, and/or the amount of the output fins being electrically connected together in the logic output region on the non-critical path are adjusted while the other fins in the logic operation region on the non-critical path are not adjusted. Furthermore, fins in both of the logic operation region and the logic output region on the critical path 610c are never adjusted according to the preferred embodiment. Consequently, the whole performance time is not increased because the sensitive critical path is impervious in the preferred embodiment. Therefore power optimization is easily achieved without impacting the electrical performance of the whole circuits according to the method of designing the fin-based transistor provided by the preferred embodiment.

Figure 9:
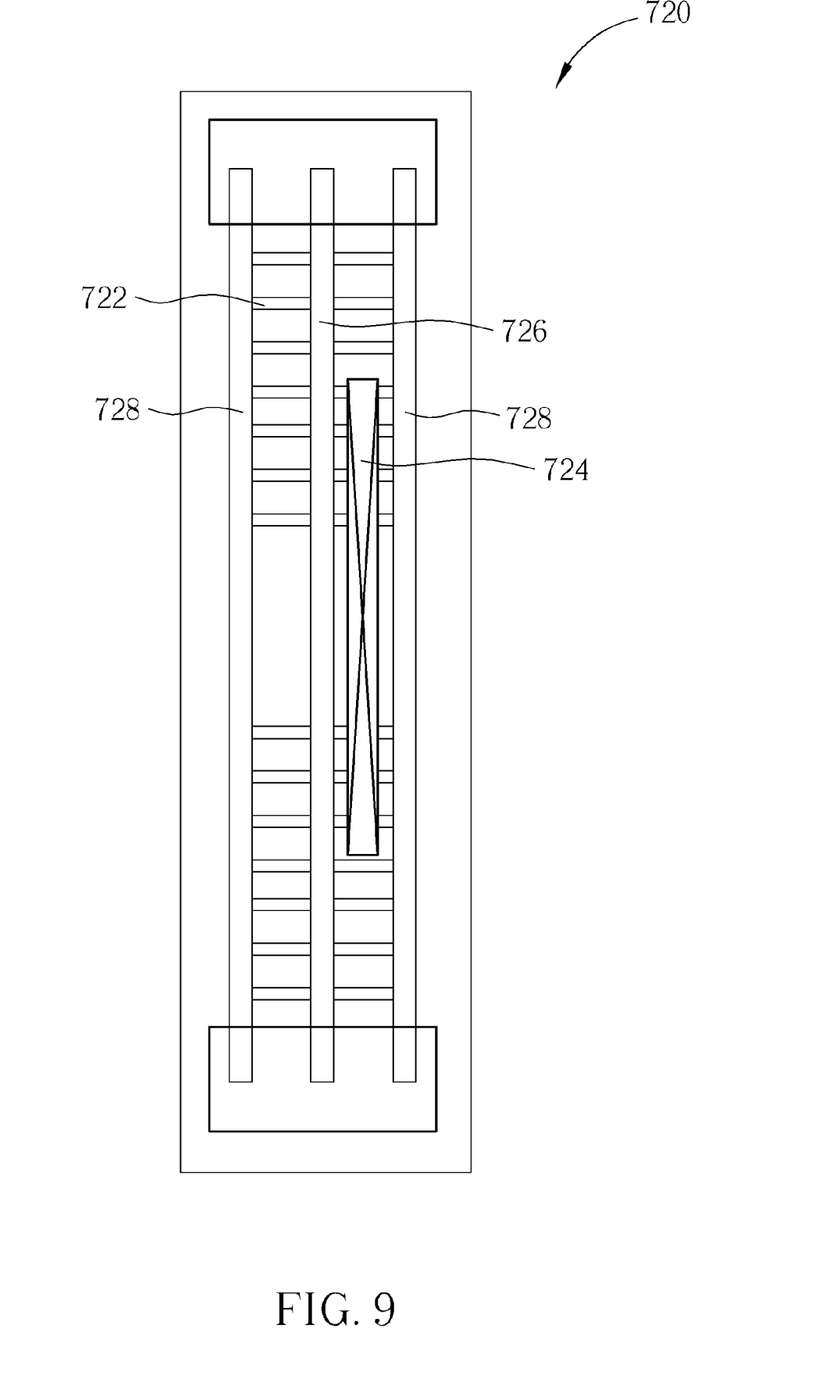
FIG. 9 is a schematic drawing illustrating a modification to the method of designing a fin-based transistor provided by the present invention.

Please refer to FIG. 9, which is a schematic drawing illustrating a modification to the method of designing a fin-based transistor provided by the present invention. It is noteworthy that the provided modification can be adopted in the aforementioned first to fifth preferred embodiments, but not limited. According to the modification, Steps 102-108 are performed and thus a refined FinFET design 720 is obtained. The refined FinFET design 720 includes a plurality of refined fins 722, a connection layer or a refined connection layer 724, and a gate electrode 726. Then, a plurality of dummy gates 728 are inserted into the refined FinFET design 720 and followed by performing Steps 110-114. Thus semiconductor devices with fin structures are formed according to the refined FinFET design 720 including the dummy gates 728. The insertion of the dummy gates 728 improves uniformity of the refined FinFET design and thus the manufacturing process for the fin-based semiconductor devices is further improved.

According to the present invention, the fin-based semiconductor devices in the initial FinFET design are categorized into the critical path and non-critical path, and the fin-based semiconductor device on the non-critical path in the initial FinFET design is adjusted. For example, an amount of fins of the fin-based semiconductor devices on the non-critical path and/or an amount of the output fins in the logic output region on the non-critical path can be reduced, a width of the fins of the fin-based semiconductor devices on the non-critical path and/or a width of the output fins in the logic output region on the non-critical path can be increased, and/or an amount of the fins being electrically connected together on the non-critical path and/or an amount of the output fins being electrically connected together in the logic output region on the non-critical path can be reduced according to the present invention. And thus the refined FinFET design is obtained. More important, since power consumption is related to the sum of total current $I_{ds}$, and the sum of total current $I_{ds}$ is related to the amount of the fins, the width of the fins, and the amount of the fins being electrically connected together, power optimization can be efficaciously achieved by adjusting the abovementioned factors. And the current required by the refined FinFET design is smaller than the current required by the initial FinFET design. Furthermore, the provided modulation is never performed to the devices on the critical path, therefore the performance time will not be impacted and increased. In other words, power optimization is easily achieved without impacting the electrical performance of the whole circuits according to the method of designing the fin-based transistor provided by the preferred embodiment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of designing a fin-based transistor, comprising:
    receiving an initial fin field-effect transistor (FinFET) design, the initial FinFET design comprising a plurality of fin-based semiconductor devices;
    performing a timing analysis to recognize at least a critical path and at least a non-critical path in the initial FinFET design, the non-critical path comprising at least one of the fin-based semiconductor devices; and
    adjusting the fin-based semiconductor device in the non-critical path to generate a refined FinFET design, a current required by the refined FinFET design being lower than a current required by the initial FinFET design.

2. The method of designing the fin-based transistor according to claim 1, wherein the step of receiving the initial FinFET design further comprises:
    receiving a planar field-effect transistor (planar-FET) design, the planar-FET design comprising a plurality of planar semiconductor devices; and
    generating the initial FinFET design, the fin-based semiconductor devices of the initial FinFET design being corresponding to the planar semiconductor devices of the planar-FET design.

3. The method of designing the fin-based transistor according to claim 1, wherein the timing analysis comprises a static timing analysis (STA).

4. The method of designing the fin-based transistor according to claim 3, wherein the timing analysis further comprises a dynamic timing analysis (DTA).

5. The method of designing the fin-based transistor according to claim 3, wherein a timing delay of the non-critical path is shorter than a timing delay of the critical path.

6. The method of designing the fin-based transistor according to claim 1, wherein the fin-based semiconductor device on the non-critical path in the initial FinFET design comprises a plurality of initial fins, and the fin-based semiconductor device on the non-critical path in the refined FinFET design comprises a plurality of refined fins.

7. The method of designing the fin-based transistor according to claim 6, wherein an amount of the refined fins is smaller than an amount of the initial fins.

8. The method of designing the fin-based transistor according to claim 6, wherein a width of the refined fins is larger than a width of the initial fins.

9. The method of designing the fin-based transistor according to claim 6, wherein an amount of the refined fins being electrically connected together is smaller than an amount of the initial fins being electrically connected together.

10. The method of designing the fin-based transistor according to claim 1, wherein the fin-based semiconductor device comprises a p-typed fin field effect transistor (p-FinFET) and an n-typed fin field effect transistor (n-FinFET).

11. The method of designing the fin-based transistor according to claim 10, wherein the p-FinFET comprises a plurality of initial p-fins in the initial FinFET design and a plurality of refined p-fins in the refined FinFET design, the n-FinFET comprises a plurality of initial n-fins in the initial FinFET design and a plurality of refined n-fins in the refined FinFET design.

12. The method of designing the fin-based transistor according to claim 11, wherein an amount of the refined p-fins being electrically connected together is smaller than an amount of the initial p-fins being electrically connected together, and an amount of the refined n-fins being electrically connected together is smaller than an amount of initial n-fins being electrically connected together.

13. The method of designing the fin-based transistor according to claim 1, wherein the non-critical path in the initial FinFET design comprises a plurality of initial output fins and the non-critical path in the refined FinFET design comprises a plurality of refined output fins.

14. The method of designing the fin-based transistor according to claim 13, wherein an amount of the refined output fins is smaller than an amount of the initial output fins.

15. The method of designing the fin-based transistor according to claim 13, wherein a width of the refined output fins is larger than a width of the initial output fins.

16. The method of designing the fin-based transistor according to claim 13, wherein an amount of the refined output fins being electrically connected together is smaller than an amount of the initial output fins being electrically connected together.

17. The method of designing the fin-based transistor according to claim 1, further comprising inserting a plurality of dummy gates into the refined FinFET design.

18. The method of designing the fin-based transistor according to claim 1, further comprising performing a timing analysis to the refined FinFET design to verify the refined FinFET design after generating the refined FinFET design.

19. The method of designing the fin-based transistor according to claim 18, further comprising tuning the refined FinFET design when the refined FinFET does not meet a design rule.

20. The method of designing the fin-based transistor according to claim 18, further comprising finalizing a planar design to non-planar design conversion and forming a plurality of fin structures on a substrate according to the refined FinFET design when the refined FinFET meets a design rule.

* * * * *